United States Patent
Ogata et al.

(10) Patent No.: US 7,644,905 B2
(45) Date of Patent: Jan. 12, 2010

(54) SPIRAL SUPPORT, INSTALLATION METHOD OF THE SAME, AND CABLE LAYING METHOD USING THE SPIRAL SUPPORT

(75) Inventors: Kazuya Ogata, Sakura (JP); Hidenori Fukumoto, Toyonaka (JP); Atsuya Takahashi, Tokyo (JP); Masahiro Shibata, Tokyo (JP)

(73) Assignees: Fujikura Ltd., Tokyo (JP); Nippon Telegraph and Telephone West Corporation, Osaka (JP); Nippon Telegraph and Telephone East Corporation, Tokyo (JP); Kyoei High Opt Co., Ltd., Tokyo (JP)

( * ) Notice: Subject to any disclaimer, the term of this patent is extended or adjusted under 35 U.S.C. 154(b) by 423 days.

(21) Appl. No.: 11/472,317

(22) Filed: Jun. 22, 2006

(65) Prior Publication Data

US 2006/0237701 A1     Oct. 26, 2006

(51) Int. Cl.
  *H02G 1/02*     (2006.01)
  *B65H 59/00*    (2006.01)
(52) U.S. Cl. .................... 254/134.3 CL; 254/134.3 PA
(58) Field of Classification Search ........ 254/134.3 CL, 254/134.3 R, 134.3 PA
  See application file for complete search history.

(56) References Cited

U.S. PATENT DOCUMENTS

| | | | | |
|---|---|---|---|---|
| 2,744,707 A | * | 5/1956 | Peterson | 248/61 |
| 3,136,844 A | * | 6/1964 | Petersen | 174/90 |
| 3,479,013 A | * | 11/1969 | Williams | 254/134.3 R |
| 4,582,297 A | * | 4/1986 | Conti | 254/134.3 FT |
| 6,227,522 B1 | * | 5/2001 | Chikiri et al. | 254/134.3 R |
| 6,505,818 B1 | * | 1/2003 | Nimiya et al. | 254/134.3 R |
| 2003/0020056 A1 | * | 1/2003 | Nimiya et al. | 254/134.3 CL |
| 2003/0066991 A1 | * | 4/2003 | Nimiya et al. | 254/134.3 CL |
| 2006/0237701 A1 | * | 10/2006 | Ogata et al. | 254/134.3 CL |

FOREIGN PATENT DOCUMENTS

| | | |
|---|---|---|
| JP | 48-66095 | 8/1973 |
| JP | 52-4033 A | 2/1977 |
| JP | 52-4033 A | 2/1997 |
| JP | 10-257656 A | 9/1998 |
| JP | 11-164461 A | 6/1999 |
| JP | 11-308720 A | 11/1999 |
| JP | 2000-270431 A | 9/2000 |
| JP | 2002-345116 A | 11/2002 |
| JP | 2005-168284 A | 6/2005 |

* cited by examiner

*Primary Examiner*—Lee D Wilson
(74) *Attorney, Agent, or Firm*—Sughrue Mion, PLLC

(57) ABSTRACT

A method and apparatus including an easily installed spiral support useful laying a cable. The spiral support is composed of a counterclockwise spiral portion and a clockwise spiral portion, both of which are connected to each other with a reverse portion therebetween. The spiral support is installed on a messenger wire in such a way that the reverse portion is fitted on the messenger wire; the spiral support is rotated counterclockwise or clockwise; and these steps are repeated.

18 Claims, 11 Drawing Sheets

SPIRAL SUPPORT, INSTALLATION METHOD OF THE SAME, AND CABLE LAYING METHOD USING THE SPIRAL SUPPORT

BACKGROUND OF THE INVENTION

This application is based on Japanese Patent Application No. 2004-324228, filed Nov. 8, 2004, corresponding to Japanese Patent Publication No. 2005-168284, the contents of which are incorporated herein by reference.

1. Field of the Invention

The present invention relates to a spiral support to be used in bundling various cables including wires, specifically optical fiber cables such as aerial optical fiber cables or the like into one bundle unit. In addition, the present invention relates to the installation method of the same and the cable laying method using the spiral support.

2. Description of the Related Art

Such a spiral support is composed of one-way spiral formed from one end to the other and is categorized into 2 groups in terms of its length, which makes the cable laying method different.

One is a tightly wound spiral support that is constricted along its axis direction and has a total length that can cover a predetermined span corresponding to the distance between support posts such as electric poles after the spiral support is pulled to be laid out. This type of the spiral support is installed in such a way that the spiral support is fitted on a support wire (messenger wire) so as to house the messenger wire thereinside and then pulled along the messenger wire. In this case, one end of the spiral support is attached on one support post and then the other end is attached on the other support post after having been pulled (See, Examined Patent Application Publication No. S52-4033).

The other one is a short, relatively-rigid spiral support that has a total length of for example 1.5 m, which is much shorter than the predetermined span, and has a male and female connector (or joint) respectively on both ends. This spiral support is installed in such a way that one end of the spiral support is fitted on the messenger wire that has been stretched in advance; the spiral support is rotated in the spiral direction so as to allow the messenger wire to be housed inside the spiral support; another spiral support of the same type is connected to the other end of the previous spiral support; and then these procedures will be repeated until the sufficient number of the spiral supports that can cover the predetermined span is installed. Then, both ends of the connected spiral supports are attached to the messenger wire near each support post to complete the installation (See, Japanese Patent Application Laid-open Publication No. 2002-345116).

However, regarding such related-art spiral supports, either when the singular spiral support that can cover the predetermined span is installed (the former one) or when plural short spiral supports are installed by connecting or jointing them (the latter one), there has been the following disadvantage.

Since the former one is like a long coil, when such a spiral support is installed on the messenger wire that has been stretched in advance, the one end thereof is fitted on the messenger wire, and then the spiral support has to be continuously rotated in the spiral direction so as to allow the messenger wire to be housed inside until all the length thereof is installed.

Such installation is laborious, especially, when the diameter of a wire constituting the spiral support is larger. In addition, when the number of rotations is increased, such installation imposes a huge burden on a worker.

Moreover, when the spiral support is pulled to cover the span between the two support posts after it has been installed on the messenger wire, it is helpful that the rear end (opposite to the end to be pulled) is attached to the support post. However, when the spiral support is pulled along the messenger including a branch wire to form a T-shape therein, the spiral support has to be rotated to pass through the branch wire, which makes it impossible that the rear end is attached on the support post.

Nevertheless, if the rear end is not prevented from leaving the support post, the spiral support cannot be pulled. Therefore, when there is such a T-branch in the messenger wire, it is very difficult to install the spiral support of this type.

The latter one is more practical than the former one, when the spiral the messenger wire that has been stretched in advance includes T-branches.

However, a plural of short spiral supports have to be connected by connecting a female connector of one spiral support to a corresponding male connector of another, which costs labor and time. In addition, every time the short spiral supports are connected, the number of the connectors is increased accordingly. The connectors are positioned at random along the spiral direction, which may hinder the movement of the spiral supports when the spiral supports are pulled along the messenger wire., In a worst case, when some connectors are caught up somewhere in the messenger wire, the spiral supports cannot be pulled any more, resulting in a halt in installation.

In addition, when there is a branch for example in a T-shape somewhere in the messenger wire, it is difficult that the short spiral supports are rotated in one direction in order to pass through the branch. This is because the connector is more rigid than any other portion of the spiral supports and thus the spiral support lacks flexibility as a whole. Therefore, it is difficult to install such a spiral support when the messenger wire includes T-branches.

Therefore, when such spiral supports are installed on the messenger wire including a T-branch, installation has to be halted in front of the T-branch and then started over for the rest of the messenger wire after the T-branch, which is rather troublesome.

The present invention has been made in order to eliminate the above disadvantages and an aspect thereof is a provision of a spiral support that facilitates installation without requiring connection means such as connectors or the like, an installation method of the spiral support, and a cable laying method using the spiral support.

SUMMARY OF THE INVENTION

In order to accomplish the above, a first aspect of the present invention provides a spiral support comprising counterclockwise spiral portions and clockwise spiral portions that are alternately connected to each other along an axis line with a reverse portion therebetween.

A second aspect of the present invention provides a spiral support according to the first aspect, wherein the reverse portion includes an L/R reverse portion that is arc-shaped and provided where each of the counterclockwise spiral portions continues in one direction along the axis line to a neighboring one of the clockwise spiral portions, and an R/L reverse portion that is arc-shaped and provided where each of the clockwise spiral portions continues in the direction to a neighboring one of the counterclockwise spiral portions; wherein the L/R reverse portions are directed to a first direction and aligned substantially along one straight line; and the R/L reverse portions are directed to a second direction and aligned substantially along another straight line.

A third aspect of the present invention provides a spiral support according to the first or the second aspect, wherein seen from along the axis line the L/R reverse portions and the R/L reverse portions are positioned on the same circumference formed by the counterclockwise spiral portions and the clockwise spiral portions.

A fourth aspect of the present invention provides a spiral support according to any of the first through the third aspect, wherein the counterclockwise spiral portions and the clockwise spiral portions have the same number of turns.

A fifth aspect of the present invention provides a spiral support according to any of the first through the fourth aspect, wherein each turn of the spiral in the counterclockwise spiral portions and the clockwise spiral portions contacts a neighboring one.

A sixth aspect of the present invention provides a spiral support according to any of the first through the fourth aspect, wherein each turn of the spiral in the counterclockwise spiral portions and the clockwise spiral portions is spaced apart in substantially the same manner that the counterclockwise spiral portions and the clockwise spiral portions are spaced apart by the reverse portion.

A seventh aspect of the present invention provides a spiral support according to the sixth aspect, wherein seen from along the axis line the reverse portion protrudes from the circumference formed by the counterclockwise spiral portions and the clockwise spiral portions.

An eighth aspect of the present invention provides a spiral support according to the sixth or the seventh aspect, wherein the counterclockwise spiral portions and the clockwise spiral portions have a turn number ranging from 1.7 to 1.9.

A ninth aspect of the present invention provides a spiral support according to any of the sixth through the eighth, wherein each turn of the spiral in the counterclockwise spiral portions and the clockwise spiral portions is inclined at an angle of less than 45 degrees in relation to the axis line.

A tenth aspect of the present invention provides a method of installing a spiral support on a support wire, the spiral support being composed of counterclockwise spiral portions and clockwise spiral portions that are connected alternately with each other with a reverse portion therebetween along an axis line. The method comprising fitting one of the reverse portions on the messenger wire that has been stretched in advance while the axis line of the spiral support is held along the messenger wire, rotating the spiral support along the spiral direction so as to house the messenger wire inside the counterclockwise spiral portion or the clockwise spiral portion that is adjacent to the one of the reverse portions, fitting another one of the reverse portions on the messenger wire, the another one of the reverse portions being adjacent to the counterclockwise spiral portion or the clockwise spiral portion that has the messenger wire housed thereinside, rotating the spiral support along the spiral direction so as to house the messenger wire inside the counterclockwise spiral portion or the clockwise spiral portion that is adjacent to the another one of the reverse portions, and repeating the precedent steps in the stated order until the spiral support has the messenger wire housed over the entire length thereof.

An eleventh aspect of the present invention provides a method of installing a spiral support on a support wire, the spiral support being composed of counterclockwise spiral portions and clockwise spiral portions that are connected alternately with each other with a reverse portion therebetween along an axis line, each turn of the counterclockwise and clockwise portions being spaced apart from each other. The method comprising attaching a cable lead-in wire to one end portion of the spiral support, fitting one of the reverse portions that is closer to the one end portion to which the cable lead-in wire is attached on the messenger wire that has been stretched in advance, rotating the spiral support along the spiral direction so as to house the messenger wire inside the counterclockwise spiral portion or the clockwise spiral portion that is adjacent to the one of the reverse portions, fitting another one of the reverse portions on the messenger wire, the another one of the reverse portions being adjacent to the counterclockwise spiral portion or the clockwise spiral portion that has the messenger wire housed thereinside, rotating the spiral support along the spiral direction so as to house the messenger wire inside the counterclockwise spiral portion or the clockwise spiral portion that is adjacent to the another one of the reverse portions, and repeating the precedent steps in the stated order until the spiral support has the messenger wire housed over the entire length thereof, thereby installing the spiral support along with the cable lead-in wire.

A twelfth aspect of the present invention provides a method of installing a spiral support on a support wire, the spiral support being composed of counterclockwise spiral portions and clockwise spiral portions that are connected alternately with each other with a reverse portion therebetween along an axis line. The method comprising fitting the reverse portions on the messenger wire that has been stretched in advance while the axis line is held along the messenger wire, the reverse portions being directed to one direction and are substantially aligned along one line, and rotating the spiral support along the spiral direction so as to house the messenger wire inside the spiral support over the entire length thereof.

A thirteenth aspect of the present invention provides a method of installing a spiral support on a support wire. The method comprising inserting a cable lead-in wire inside the spiral support from one end to the other end thereof, the spiral support having been supported by the support wire; attaching one end of the cable lead-in wire to the other end of the spiral support; attaching the one end of the spiral support to one of posts that support the support wire stretched therebetween; and pulling the other end of the spiral support to which the one end of the cable lead-in wire is attached along the support wire until the other end of the spiral support reaches another one of the posts, thereby installing the spiral support along with the cable lead-in wire over the entire length of the spiral support.

A fourteenth aspect of the present invention provides a method of laying a cable, comprising installing a spiral support on a support wire along with a cable lead-in wire, said spiral support being composed of counterclockwise spiral portions and clockwise spiral portions that are connected alternately with each other with a reverse portion therebetween along an axis line, and pulling a cable so as to lay the cable in said spiral support by use of said cable lead-in wire.

According to the aforementioned aspects of present invention, it may not be necessary to rotate the spiral support in one direction all the way from one end thereof through the other. In stead, the messenger wire that has been stretched in advance can be housed therein by rotating the spiral support in alternative directions, because the spiral support is comprised of counterclockwise spiral portions and clockwise spiral portions that are connected alternately with a reverse portion respectively therebetween along an axis line. In addition, it is not necessary to start installation from an end of the spiral support. In stead, installation can start from any reverse portion only by fitting any reverse portion and then rotating along spiral. Moreover, due to the reverse portion, it is easy to install such a spiral support on a messenger wire including T-branches. As a result, workability may be highly improved.

Moreover, according to the spiral support, since counterclockwise rotation and clockwise rotation are carried out alternately, there is prevented one-way rotational force and its reactive force, thereby facilitating installation of the spiral support over the entire length thereof and, if necessary, the cable lead-in wire. If the cable lead-in wire is installed along with the spiral support, the cable lead-in wire allows a cable to be easily laid inside the spiral support, thereby significantly improving workability in bundling cables.

DESCRIPTION OF THE EXEMPLARY EMBODIMENTS

Referring to accompanying drawings, the illustrative non-limiting exemplary embodiments according to the present invention will be described.

Regarding a spiral support according to the illustrative non-limiting exemplary embodiments, there will be described a first exemplary embodiment in which every turn of the spiral is tightly wound so that the adjacent turns contact each other in a spiral portion and thus the spiral support is pulled at the time of installation, and a second embodiment in which every turn of the spiral is loosely spaced and thus the spiral support is installed as it is without being pulled.

Figure 1:
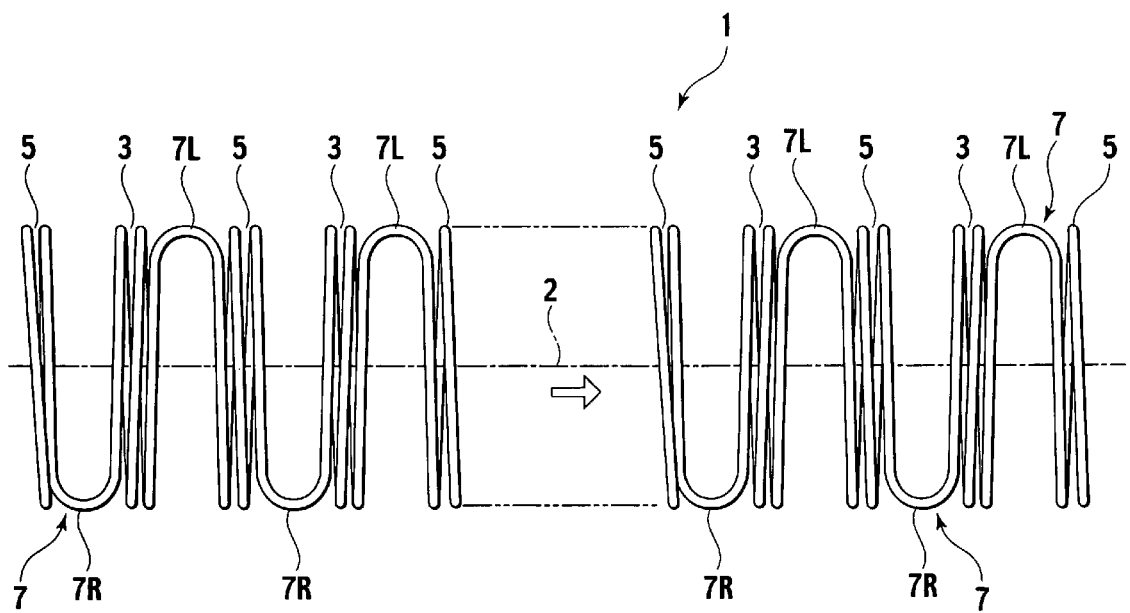
FIG. 1 is a schematic front view of a spiral support according to the present invention.
Figure 2:
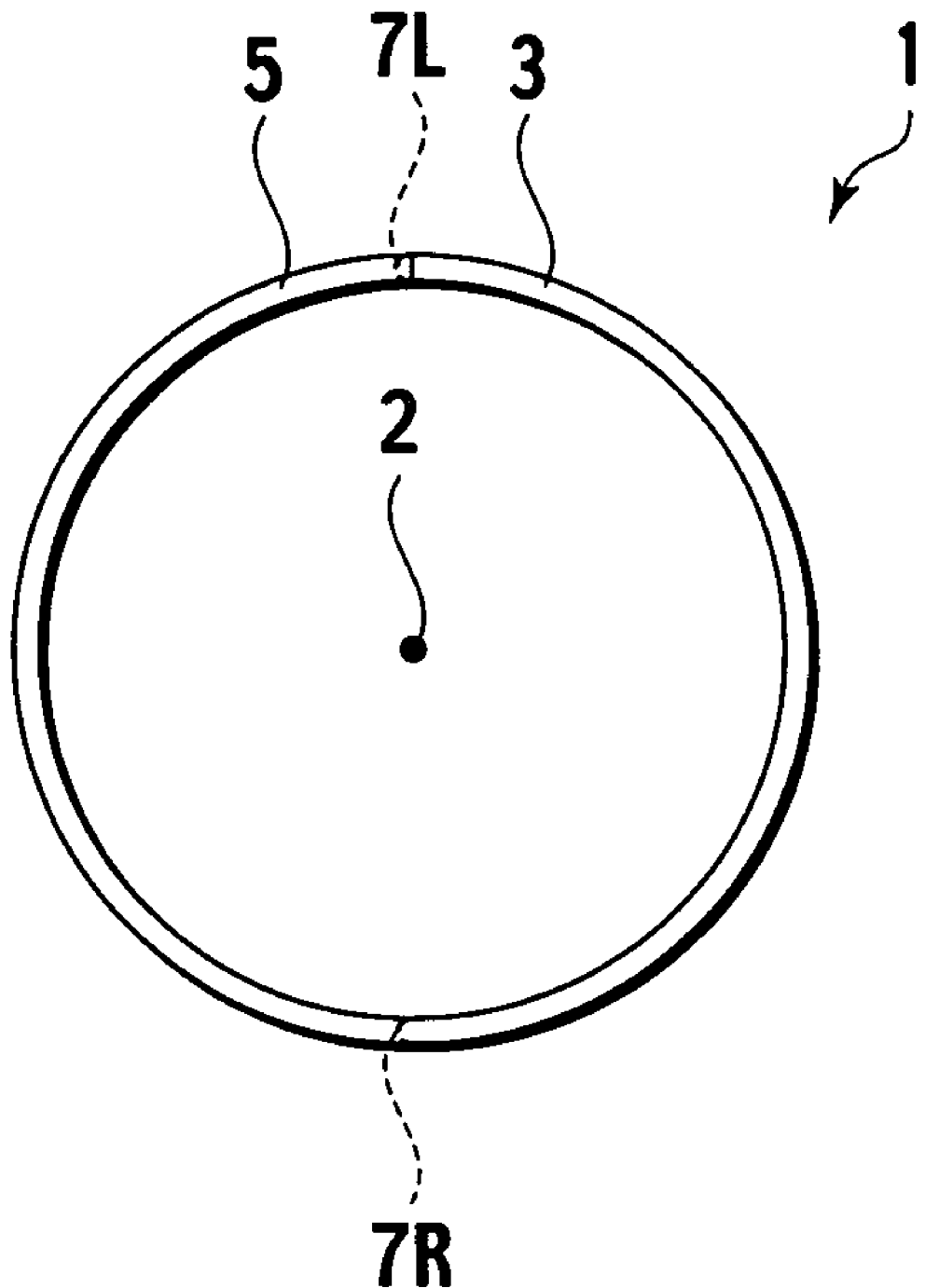
FIG. 2 is a side view of the spiral support shown in FIG. 1.

FIG. 1 is a schematic front view of a spiral support according to a first exemplary embodiment of the present invention. FIG. 2 is a side view of the spiral support seen from the axis direction.

A spiral support 1 is composed of a left-handed circular (or counterclockwise) spiral portion 3 being spirally wound counterclockwise along one direction of an axis line 2 (for example, the direction represented by an open arrow in FIG. 1), a right-handed circular (or clockwise) spiral portion 5 being spirally wound clockwise along the direction, and a reverse portion 7 that connects the counterclockwise spiral portion 3 and the clockwise spiral portion 5. The counterclockwise spiral portion 3 and the clockwise spiral portion 5, which have the same number of turns per one pitch (distance between the reverse portions), are formed alternately along the axis line 2.

The spiral support 1 according to this exemplary embodiment is made of a zinc-electroplated steel wire covered with a polyethylene cladding and has a length shorter than the distance between a support post 20$k$ and a support post 20$k$+1 between which the spiral support 1 is installed.

The reverse portion 7 includes an L/R reverse portion 7L and an R/L reverse portion 7R. The L/R reverse portion 7L is arc-shaped and serves to reverse a counterclockwise spiral in the counterclockwise spiral portion 3 into a clockwise spiral in the clockwise spiral portion 5, when seen along the direction shown by the open arrow in FIG. 1. The L/R reverse portion 7L is intervened at every portion where the counterclockwise spiral portion 3 links, in the direction, to the clockwise spiral portion 5 and every L/R reverse portion 7L is aligned substantially in one line.

The R/L reverse portion 7R is also arc-shaped and serves to reverse a clockwise spiral in the clockwise spiral portion 5 into a counterclockwise spiral in the counterclockwise spiral portion 3, when seen along the direction shown by the open arrow in FIG. 1. The R/L reverse portion 7R is intervened at every portion where the clockwise spiral portion 5 links, in the direction, to the counterclockwise spiral portion 3 and every R/L reverse portion 7R is aligned substantially in another line.

As stated above, the counterclockwise spiral portion 3 and the clockwise spiral portion 5 have the same number of turns. In the counterclockwise spiral portion 3 and the clockwise spiral portion 5, every turn of the spiral meets closely with each other and is then pulled apart when the spiral support 1 is used.

Seen from along the axis line 2 as shown in FIG. 2, the L/R reverse portion 7L and the R/L reverse portion 7R is positioned on the circumference formed by the counterclockwise spiral portion 3 and the clockwise spiral portion 5, and opposes each other at an angle of about 180 degrees.

The counterclockwise spiral portion 3 and the clockwise spiral portion 5 each have the same number of turns of 2.5 (or, 2 turns and half), which is interpreted as about 900 degrees in terms of angle (a wound angle), because one turn of spiral is 360 degrees.

Figure 3:
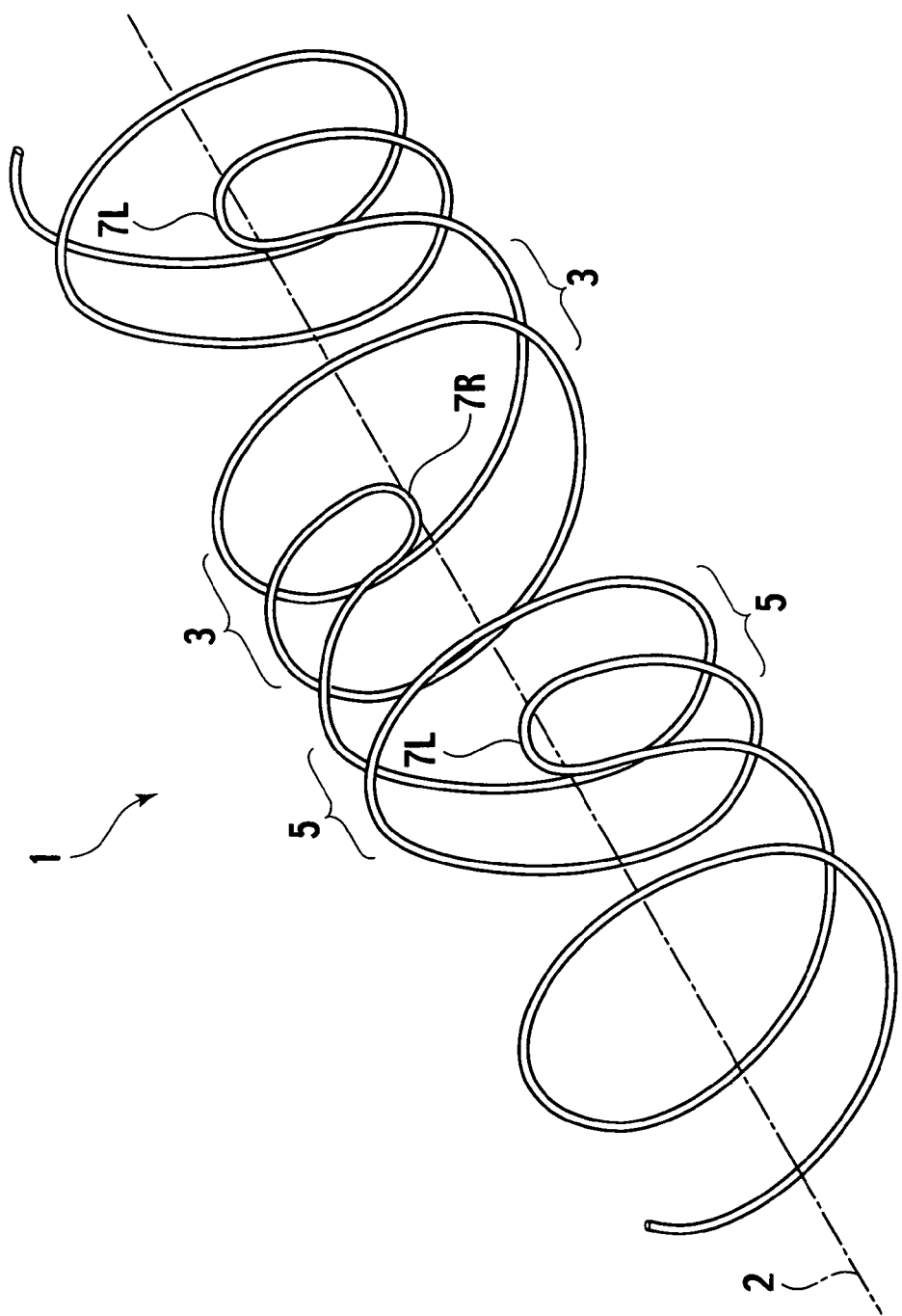
FIG. 3 is a perspective view of the spiral support shown in FIG. 1 when it has been stretched.

When the spiral support 1 is pulled, the wound angle in the spiral portions 3, 5 reduces accordingly. Specifically, when the counterclockwise spiral portion 3 and the clockwise spiral portion 5, which have the same number of turns of 2.5 and are closely wound, are pulled, the spiral portions 3, 5 are deformed and wound down as shown in FIG. 3 since the reverse portion 7 is a free end. As a result, while the neighboring reverse portions 7L, 7R originally have been spaced by a wound angle of about 900 degrees along the spiral direction, the pulling of the spiral portions 3, 5 makes the spiral wound down and thus the wound angle between the reverse portions 7L, 7R reduces in a range of about 780 degrees (720+60 degrees) to 810 degrees (720+90 degrees).

When the wound angle between the reverse portions 7 becomes about 720 degrees or lower, the arc shape of the reverse portion 7 is widely opened, which causes a disadvantage of an easier communication between the inside and the outside of the spiral support 1. In order to eliminate this disadvantage, the number of spiral turns in the counterclockwise spiral portion 3 and the clockwise spiral portion 5 has to be determined so that the in-and-out communication is assuredly prevented even when the spiral support 1 is pulled and wound down at the time of installation. In this embodiment, the wound angle is determined to be about 900 degrees or the turn number of 2.5.

By the way, the spiral support 1 is designed assuming that the spiral support 1 having a length of 4 to 5 m is pulled to be about 30 m for example. However, if the spiral support is not pulled so much, the number of spiral turns in the spiral portions 3, 5 can be reduced, for example, 2 turns (or the wound angle of 720 degrees) rather than 2.5 turns (or the wound angle of 900 degrees).

On the contrary, if the spiral support has to be pulled longer compared with the above assumption, the wound angle between the reverse portions 7 needs to be designed larger than 900 degrees. At any rate, the number of spiral turns (or the wound angle) needs to be designed so that the in-and-out communication is assuredly prevented when the spiral support is pulled.

Next, a method of installing the spiral support 1 configured as above on a messenger wire that has been stretched between support posts such as electric poles will be described, referring to FIGS. 4 through 8.

Figure 4:
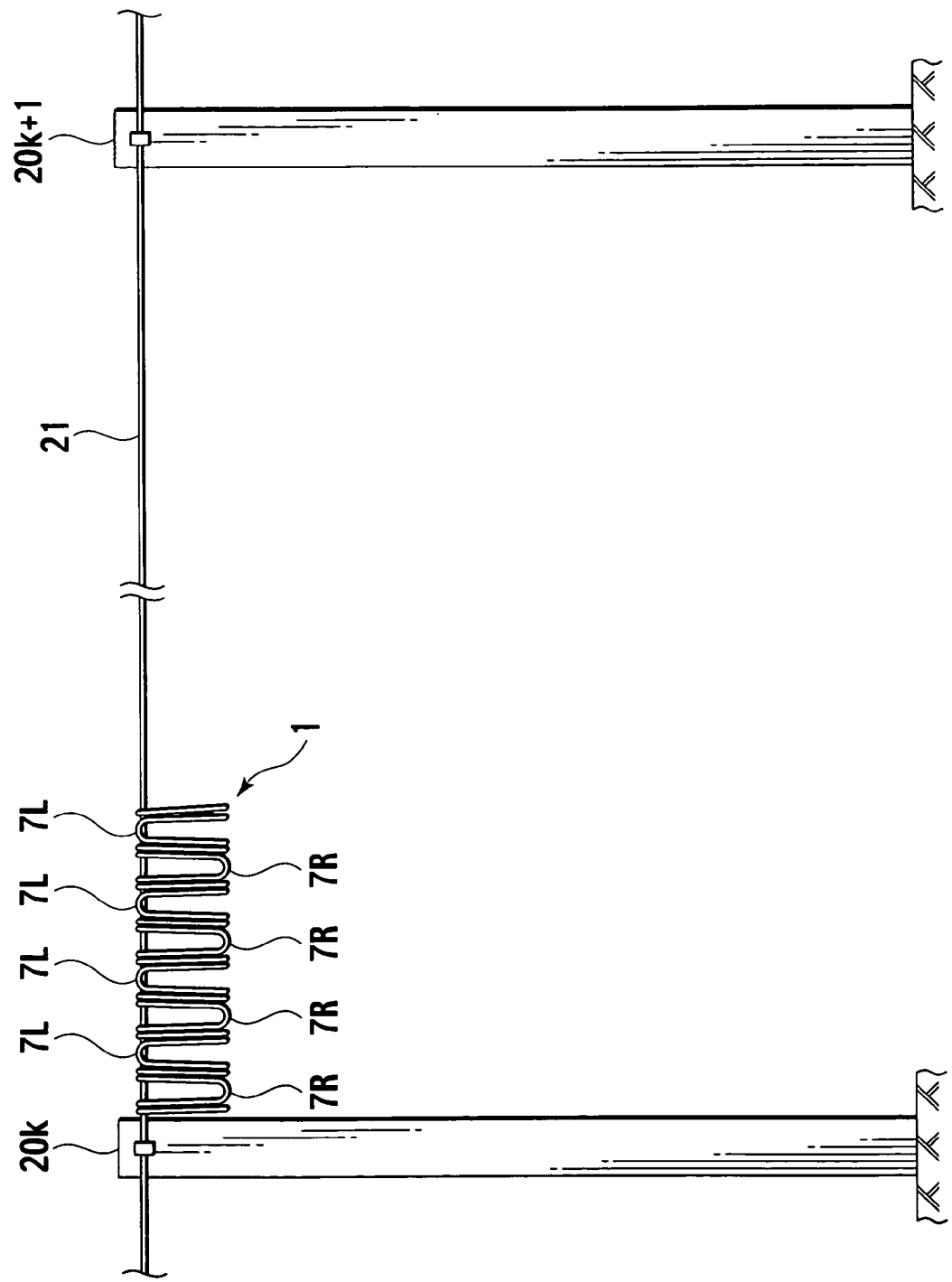
FIG. 4 is an explanatory view of a first step of a method of installing the spiral support 1 shown in FIG. 1.

As shown in FIG. 4, when the spiral support 1 is installed on a messenger wire 21 that has been stretched between support posts 20$k$, 20$k$+1 such as electric poles, first of all, the spiral support 1 has to contain the pre-stretched messenger wire 21 thereinside. There are mainly two methods of allowing the messenger wire 21 to be taken in inside the spiral support 1.

A first method will be explained in the following. Near the support post 20$k$, the reverse portion (the rightmost L/R reverse portion 7L) closest to one end (the rightmost end, in FIG. 1) of the spiral support 1 is fitted on the messenger wire 21. Next, the spiral support 1 is rotated substantially 2.5 times counterclockwise when seen in the direction of the open arrow in FIG. 1, which allows the messenger wire 21 to enter the inside of the counterclockwise spiral portion 3 and the clockwise spiral portion 5, both of which have the rightmost L/R reverse portion 7L therebetween.

Then, the R/L reverse portion 7R, which is the second rightmost reverse portion 7, is fitted on the messenger wire 21. The spiral support 1 is rotated substantially 2.5 times clockwise when seen in the direction of the open arrow in FIG. 1, which allows the messenger wire 21 to enter the inside of the clockwise spiral portion 5 which is left to the second rightmost R/L reverse portion 7R.

Next, the above procedures are repeated alternately all the way to the reverse portion 7 (the leftmost R/L reverse portion 7R in FIG. 1) closest to the other end of the spiral support 1. As a result, the messenger wire 21 runs through all the counterclockwise spiral portions 3 and the clockwise spiral portions 5.

A second method of allowing the messenger wire 21 to enter the inside of the spiral support 1 will be explained in the following. Near the support post 20$k$, all the L/R reverse portions 7L (or all the R/L reverse portions 7R) of the spiral support 1 are fitted on the messenger wire 21. Then, the spiral support 1 is rotated counterclockwise (or clockwise). This rotation operation allows the messenger wire 21 to enter the inside of the spiral support 1 all the way. This method is advantageous when the messenger wire 21 needs to be taken inside the spiral support 1 in a shorter time.

Figure 5:
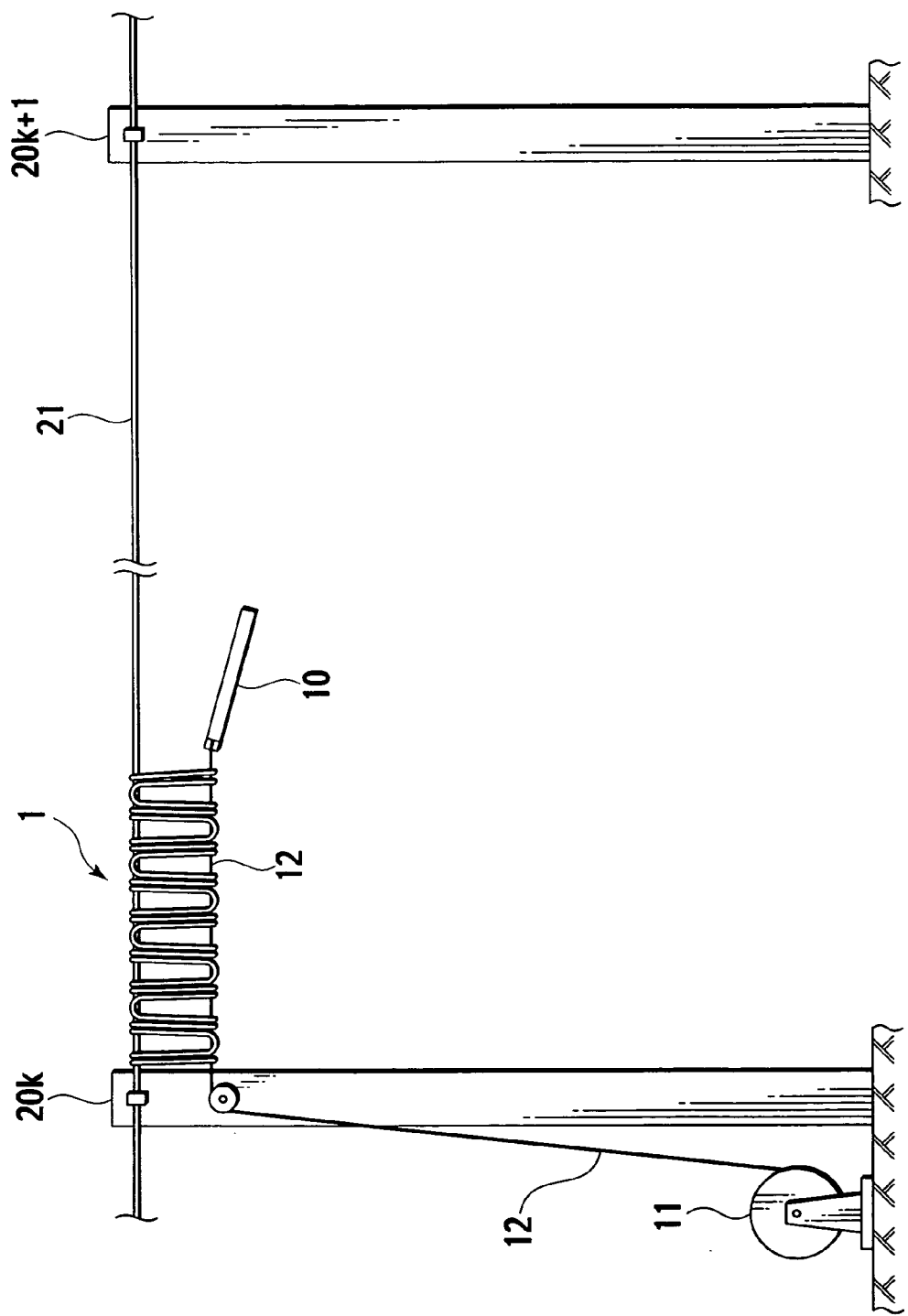
FIG. 5 is an explanatory view of a second step of the method of installing the spiral support 1 shown in FIG. 1.
Figure 6:
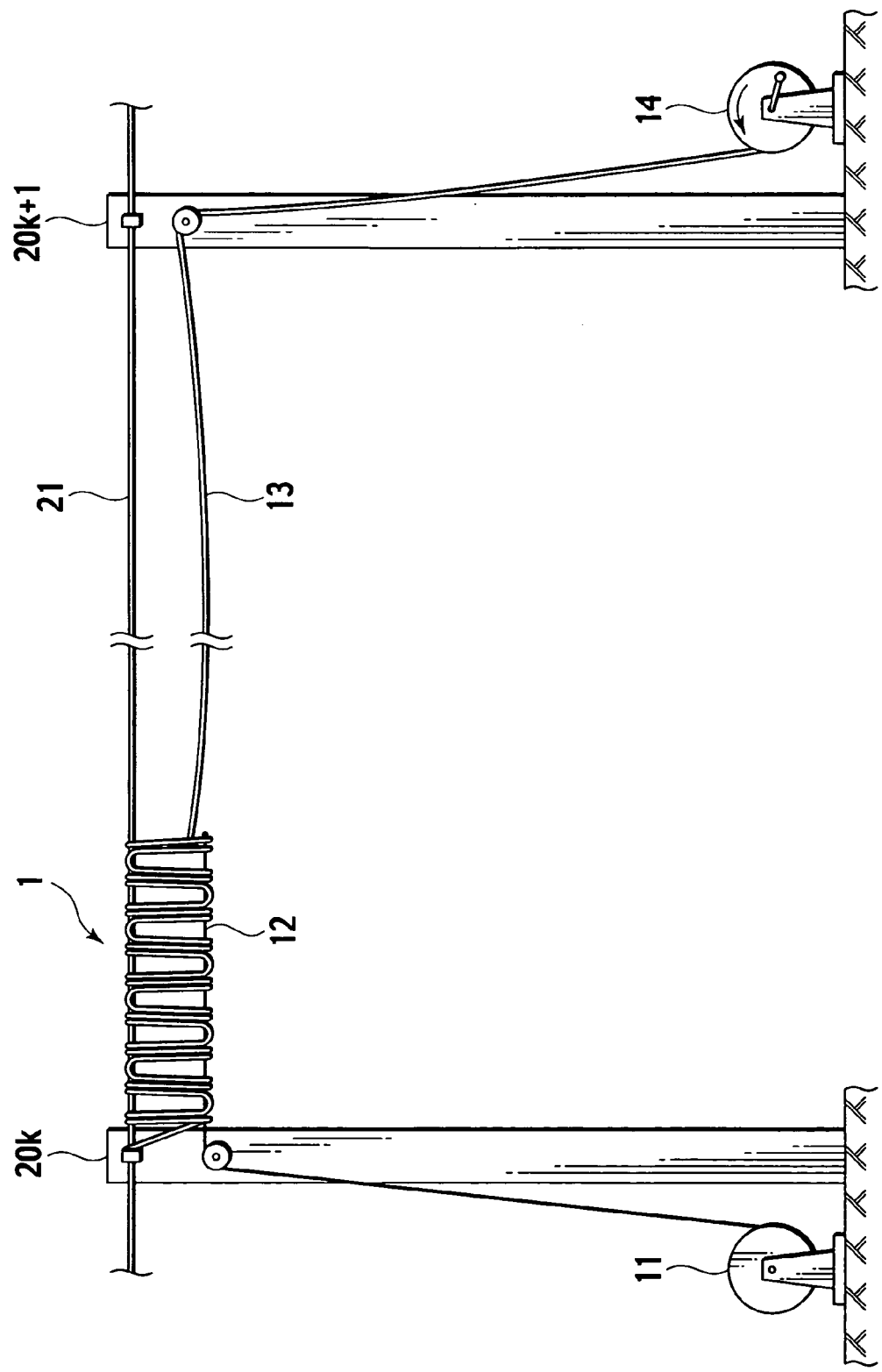
FIG. 6 is an explanatory view of a third step of the method of installing the spiral support 1 shown in FIG. 1.

FIG. 5 is an explanatory view of how a cable lead-in wire is installed. Near the support post 20$k$, one end (front end) of a cable lead-in wire 12 reeled out from a reel 11 placed on the ground is connected to a guide rod 10. The guide rod 10 is then inserted into the inside of the spiral support 1 from the left and removed out from the right (the right end in FIG. 5).

Figure 7:
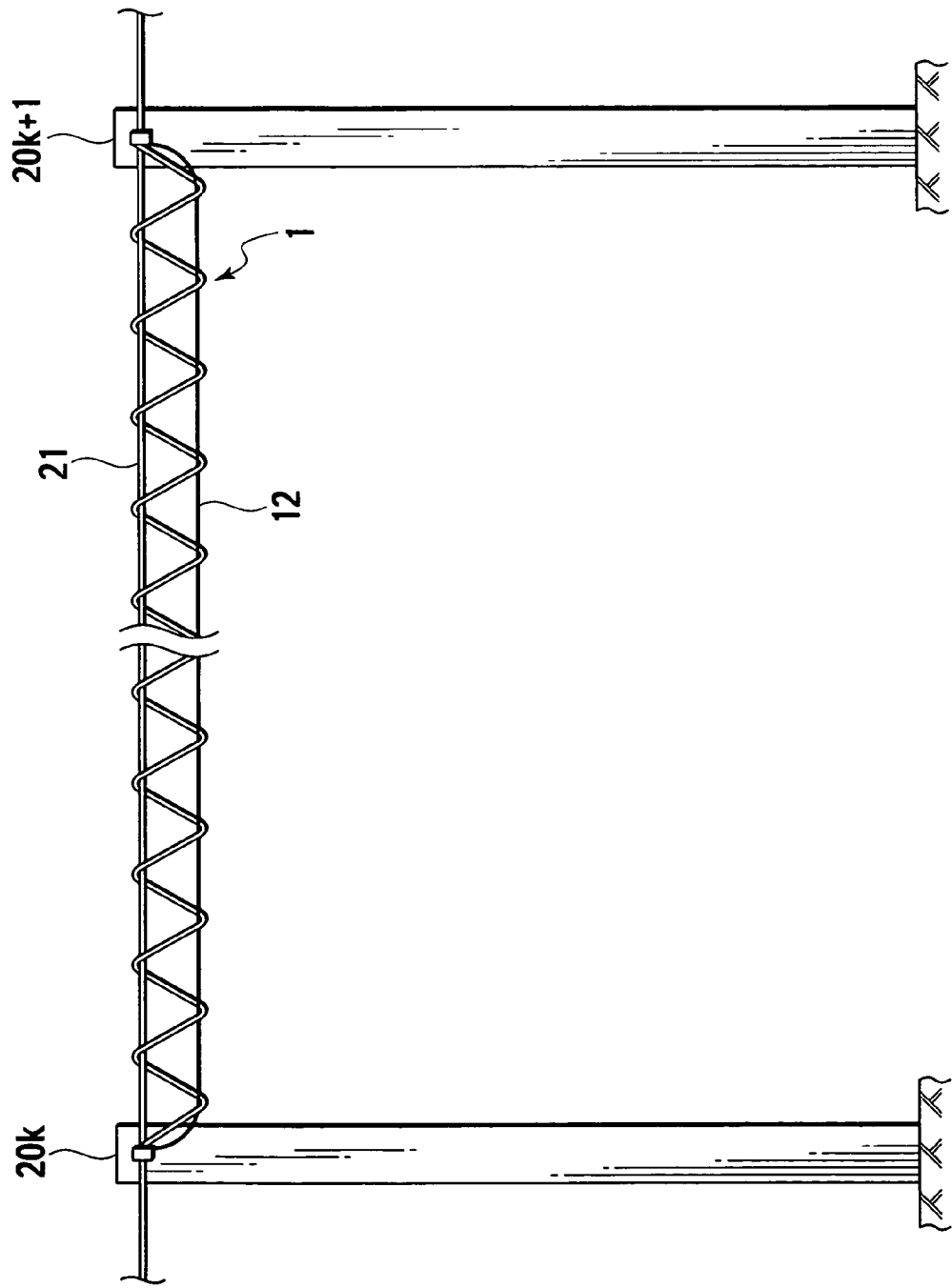
FIG. 7 is an explanatory view of the spiral support shown in FIG. 1 when it has been installed.

The cable lead-in wire 12 is removed from the guide rod 10 and the front end of the cable lead-in wire 12 is then connected to one end (the right end in FIG. 6) of the spiral support 1. Next, the rear end (the left end in FIG. 5) of the spiral support 1 is attached to a given portion of the support post 20$k$ and the front end (the right end in FIG. 6) of the spiral support 1 is attached to a pulling wire 13. Then, the pulling wire 13 is pulled from the support post 20$k$ to the support post 20$k$+1 by a winch 14 for example to stretch the spiral support 1 over the span between the support posts 20$k$, 20$k$+1 (FIG. 7).

When the spiral support 1 is installed in the above manner, there is caused no one-way rotational force or its reactive force because the counterclockwise spiral portions 3 and the clockwise spiral portions 5 link alternately each other.

In addition, when the spiral support 1 is pulled along the messenger wire 21, the counterclockwise spiral portion 3 is wound down clockwise and the clockwise spiral portion 5 is wound down counterclockwise. Therefore, even if the messenger wire 21 includes for example a T-branch and the rear end of the spiral support 1 is attached, the spiral support 1 is pulled to pass through the T-branch without any significant trouble.

Figure 8:
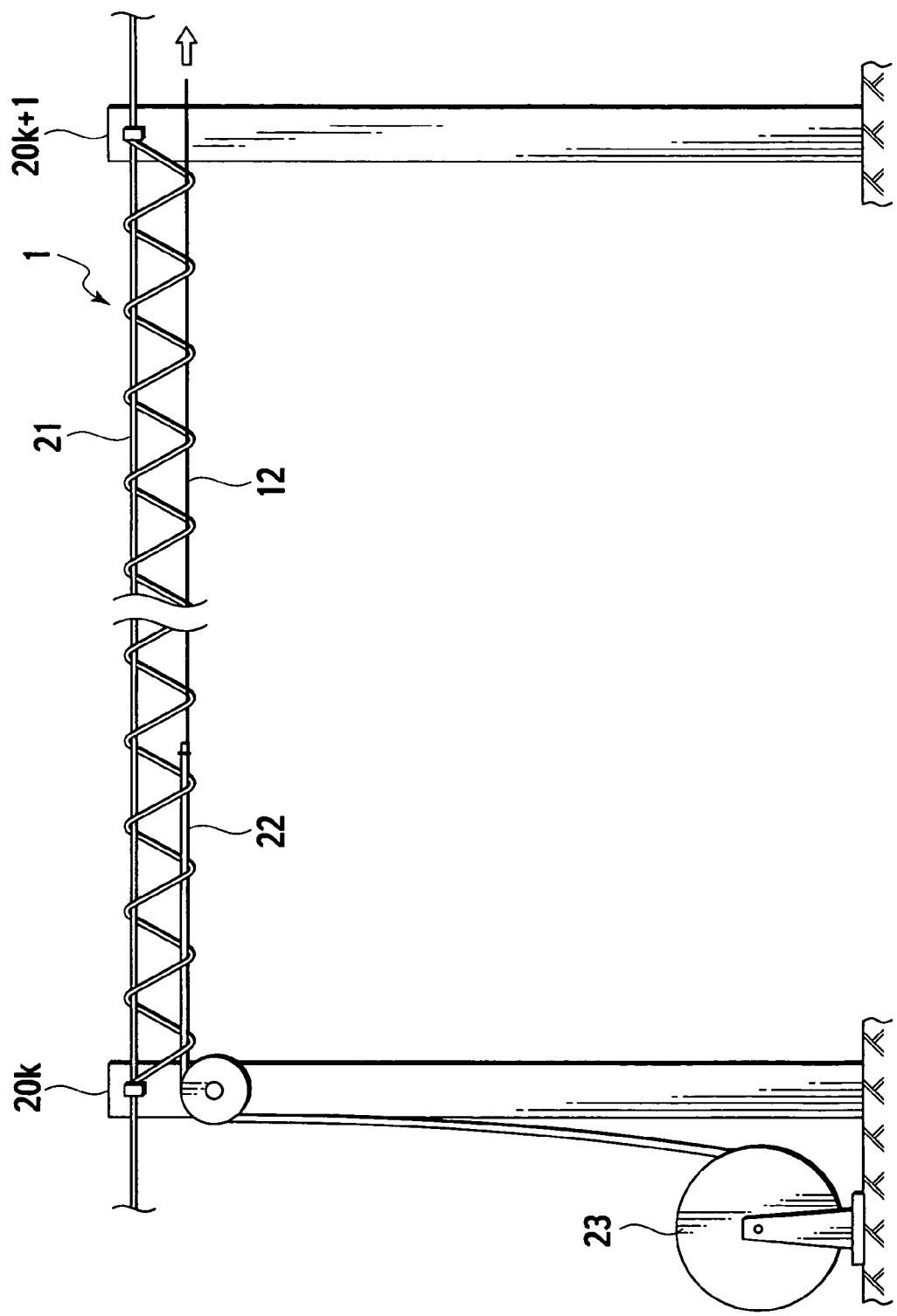
FIG. 8 is an explanatory view of a method of bundling cables using the spiral support shown in FIG. 1.
Figure 9:
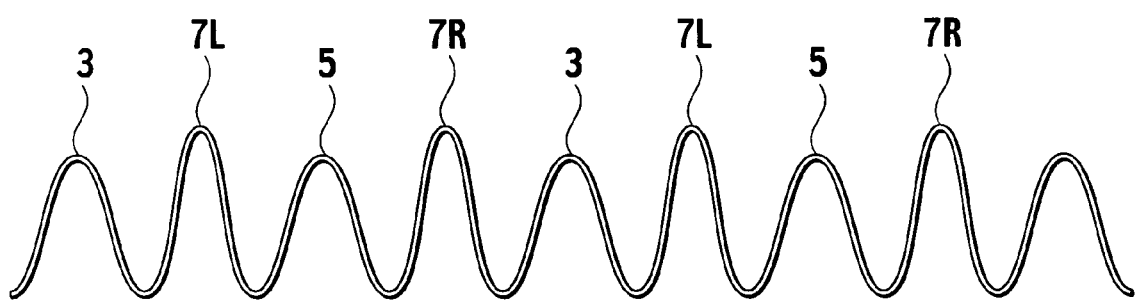
FIG. 9 is a schematic front view of a spiral support according to a second embodiment.
Figure 10:
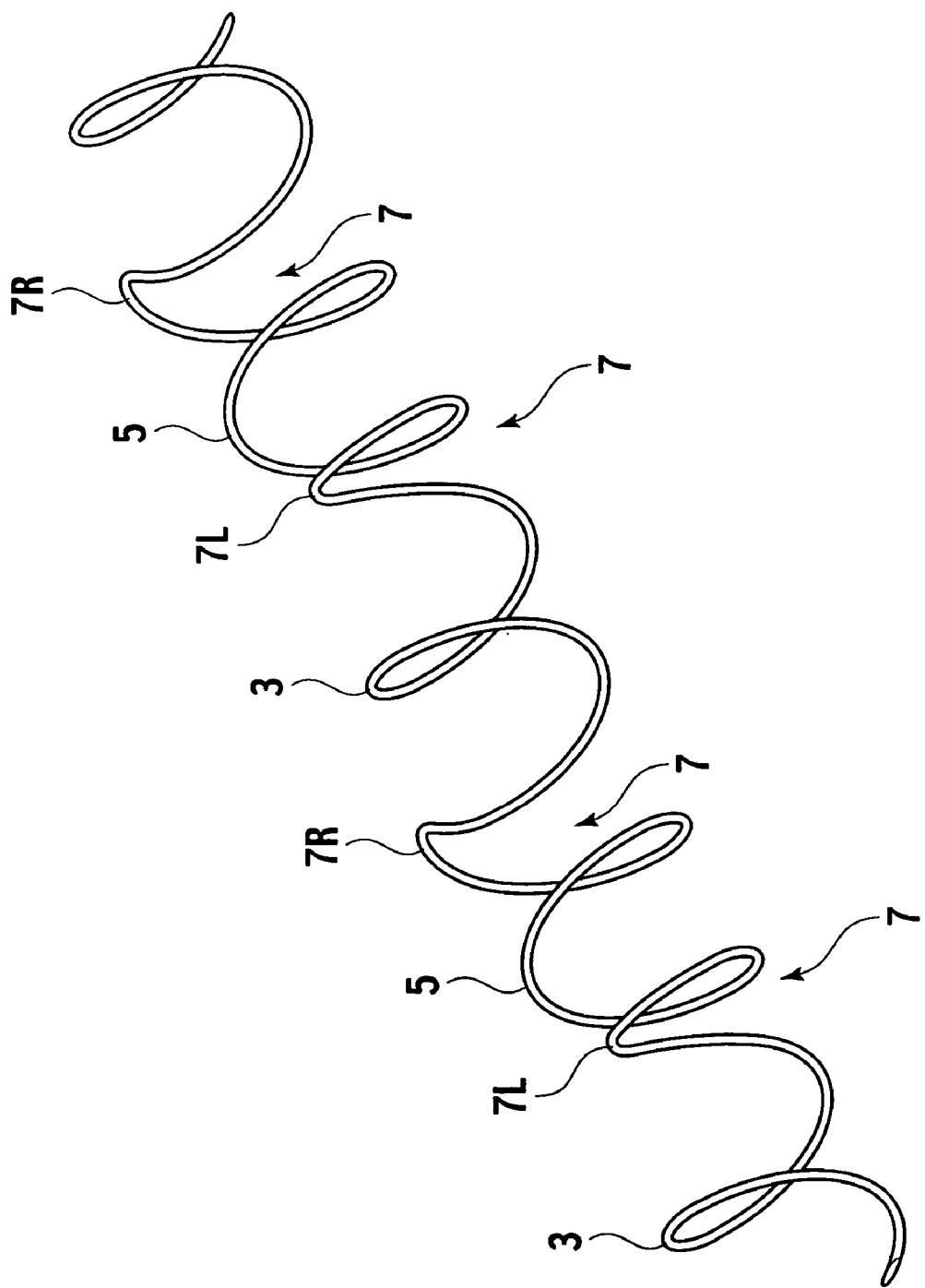
FIG. 10 is a schematic perspective view of the spiral support shown in FIG. 9.

FIG. 8 illustrates how a cable such as an assembled drop cable or the like is laid inside the spiral support. When a cable 22 such as an assembled drop cable is laid in addition to an optical fiber cable that has already been aerially laid and bundled together, first of all, the cable 22 is pulled out from a reel 23 and connected to the rear end (the left end in FIG. 8) of the cable lead-in wire 12 that has laid inside the spiral support 1 in advance. Then, the cable lead-in wire 12 is pulled in the direction represented by the open arrow. Thus, the cable 22 is pulled into the spiral support 1 and its installation is completed.

By the way, when the cable 22 is installed, another cable lead-in wire can be pulled into the spiral support 1 along with the cable 22 and laid therein by connecting the another cable lead-in wire to the rear end of the cable lead-in wire 12. This other cable lead-in wire will be preferably used to lay an additional cable (not shown) in the future.

Next, a second illustrative non-limiting exemplary embodiment according to the present invention will be described.

FIGS. 9-12 illustrate a spiral support according to the second exemplary embodiment. As shown in the drawings, the spiral support 1 is composed of the counterclockwise spiral portion 3, the clockwise spiral portion 5, and the reverse portion 7. The reverse portion 7 has the L/R reverse portions 7L that are aligned along one line and the R/L reverse portions 7R that are oppositely curved in comparison with the L/R reverse portions 7L and aligned along another line. Such a configuration is the same as the spiral support according to the first embodiment. In the second embodiment, however, the counterclockwise spiral portion 3 and the clockwise spiral portion 5 are formed so that each turn of the spiral is clearly spaced from the neighboring ones, which makes the portions 3, 5 look substantially similar to the reverse portion 7. In addition, the spiral support 1 according to the second embodiment is installed without being pulled.

Figure 11:
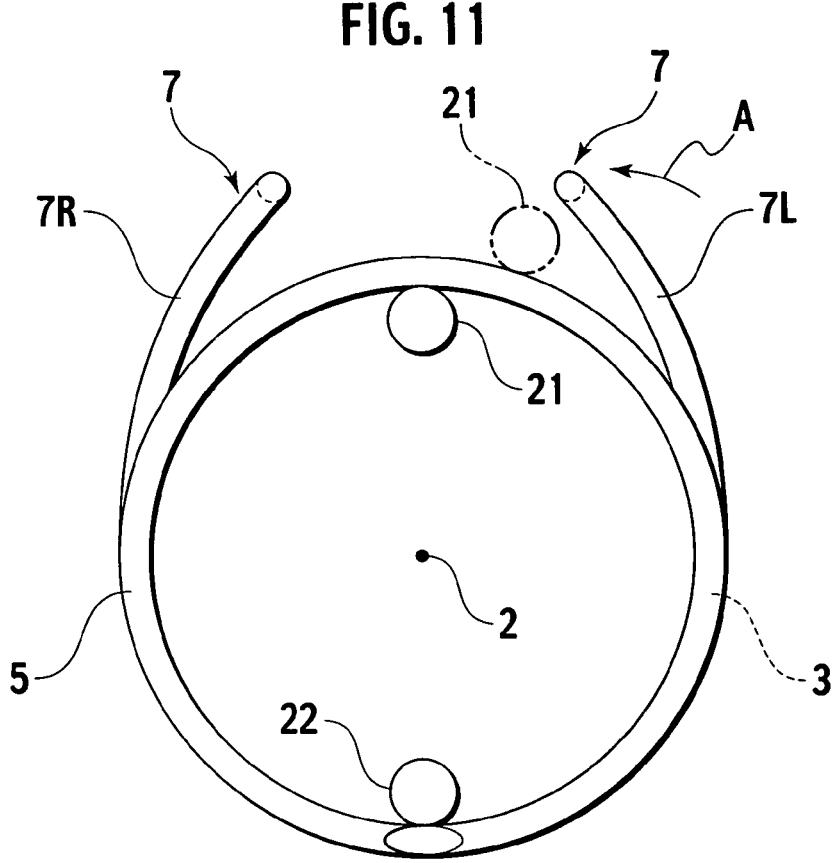
FIG. 11 is a schematic side view of the spiral support shown in FIG. 9.

The reverse portion 7 protrudes from the circumference of the counterclockwise spiral portion 3 and the clockwise spiral portion 5, when seen from along the axis line 2, as shown in FIG. 11. This makes it easier to fit the reverse portion 7 on the messenger wire 21 (shown by a broken line in FIG. 11) only by rotating the spiral support 1 in the direction represented by the arrow A in FIG. 11. In addition, the messenger wire 21 and the cable 22 inside the spiral support 1 are assuredly laid and prevented from coming out of the spiral support 1 even when a strong wind shakes the spiral support 1.

The counterclockwise spiral portion 3 and the clockwise spiral portion 5 have the same number of turns of from 1.7 to 1.9, which corresponds to from 612 degrees to 684 degrees when expressed by angle.

The turns of from 1.7 to 1.9 are determined taking account of workability. That is, after the reverse portion 7 is fitted on the messenger wire 21, only a rotation of up to 1.9 turns allows the messenger wire 21 to enter inside of the spiral support 1 in a shorter time. According to experiment results, the most preferable number of turns is 1.8.

Figure 12:
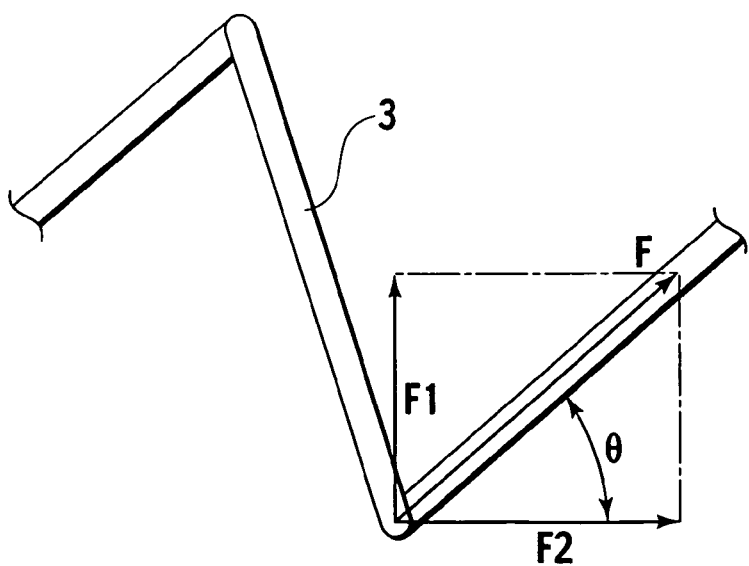
FIG. 12 illustrates an angle of each turn of the spiral portion of the spiral support in relation to its longitudinal direction.

In addition, as shown in FIG. 12, each turn in the counterclockwise spiral portion 3 and the clockwise spiral portion 5 is slanted at an angle θ of less than 45 degrees in relation to the longitudinal direction of the spiral support 1.

The angle θ of less than 45 degrees is preferable when the spiral support 1 is rotated alternately counterclockwise and clockwise to allow the messenger wire 21 to enter thereinside and at the same time pushed toward the support post 20$k$+1 along the messenger wire 21. This is explained as follows. When the force to push the spiral support 1 in the above manner is applied as expressed for example by the vector F in FIG. 12, the vector F is divided into the vector F1 in the direction perpendicular to the longitudinal direction of the spiral support 1 and the vector F2 in the longitudinal direction of the spiral support 1. Since the angle θ is less than 45 degrees in relation to the longitudinal direction of the spiral support 1, the absolute value of the divided vector F2 is greater than that of the divided vector F1, which indicates that more amount of the force serves to push the spiral support 1 in the longitudinal direction.

The spiral support 1 having such a configuration can be installed on the messenger wire 21 as described in the first embodiment. However, the spiral support 1 according to the second embodiment may have a length corresponding to the distance between the support posts 20$k$, 20$k$+1. Alternatively, the spiral support 1 according to the second embodiment can be rolled on a drum in advance; the drum is carried to the installation site; the spiral support 1 is reeled out from the drum and installed; and the spiral support 1 is cut after the installation has been completed.

In this case, the spiral support 1 is installed while the shape thereof is maintained as designed, or without changes in the number of turns of the spiral or in the reverse portion 7, since the spiral support 1 according to the second embodiment is not pulled.

On the other hand, the cable lead-in wire 12 is attached to the front end of the spiral support 1 when the spiral support 1 is installed, which makes it possible that the cable lead-in wire 12 can be pulled throughout the messenger wire 12 and laid inside the spiral support 1 at the same time the spiral support 1 is installed along the messenger wire 12.

By the way, as preparatory to installation of an additional cable, another cable lead-in wire can be pulled and laid inside the spiral support 1 at the same time the cable 22 is installed.

In addition, although each reverse portion is preferably shaped into a smooth arc as shown in the front view (FIG. 1), the shape is not limited to the arc. The reverse portion can be shaped into various profiles including a polygon that may be equated to an arc, taking formability or workability into consideration. Such profiles fall within the scope of the present invention.

Additional aspects and modifications will readily occur to those skilled in the art. Therefore, the invention in its broader aspects is not limited to the specific details and representative exemplary embodiments shown and described herein. Accordingly, various modifications may be made without departing from the spirit or scope of the general inventive concept as defined by the appended claims and their equivalents.

What is claimed is:

1. A spiral support comprising:
   a length of material having a counterclockwise turn leading into a transition portion which forms a first reversing portion being a loop transitioning to a length of said material having a clockwise turn leading into another transition portion forming a second reversing portion wherein said loops are along a common axis and said second reversing portion terminates in a length,
   wherein said first reversing portion is a left to right "L/R" reversing portion which is provided where said counterclockwise turn continues in one direction along the common axis to a neighboring one of said clockwise turns, and said second reversing portion is a right to left "R/L" reversing portion which is provided where each of said clockwise turns continues in the direction to a neighboring one of said counterclockwise turns along the common axis, and
   wherein seen from along the common axis said L/R reversing portion and said R/L reversing portion protrude from the circumference formed by said counterclockwise turn and said clockwise turn.

2. The spiral support as recited in claim 1, further comprising a plurality of L/R reversing portions and a plurality of R/L reversing portions, wherein the L/R reversing portions are provided at a first angular position about the common axis and the R/L reversing portions are provided at a second angular position about the common axis.

3. The spiral support as recited in claim 2, wherein said first angular position and said second angular position differ by 180 degrees.

4. The spiral support as recited in claim 1, wherein said first reversing portion and said second reversing portion are substantially are shaped.

5. The spiral support as recited in claim 1 wherein seen from along the common axis said L/R reversing portion and said R/L reversing portion are positioned on the same circumference formed by said counterclockwise turn and said clockwise turn.

6. The spiral support as recited in claim 1, wherein said counterclockwise turn and said clockwise turn have the same number of turns.

7. The spiral support as recited in claim 1, wherein at least one turn of the spiral in said counterclockwise turn and said clockwise turn contacts a neighboring one.

8. The spiral support as recited in claim 1, wherein each turn of a spiral in said counterclockwise turn and said clockwise turn is spaced apart in substantially the same manner that said counterclockwise turn and said clockwise turn are spaced apart by said first reversing portion or said second reversing portion.

9. The spiral support as recited in claim 8, wherein said counterclockwise turn and said clockwise turn have a turn number of from 1.7 to 1.9.

10. The spiral support as recited in claim 8, wherein each turn of the spiral in said counterclockwise turns and said clockwise turns is inclined at an angle of less than 45 degrees in relation to the common axis.

11. A method of installing a spiral support on a support wire the spiral support being composed of a length of material having a plurality of counterclockwise turns leading into a transition portion which forms a first reversing portion being a loop transitioning to a length of said material having a plurality of clockwise turns leading into another transition portion forming a second reversing portion wherein said loops are along a common axis and said second reversing portion terminates in a length, the method comprising:

fitting one of said first reversing portions or said second reversing portions on the support wire that has been stretched in advance while the common axis of said spiral support is held along the support wire;

rotating said spiral support along a spiral direction so as to house the support wire inside one of said counterclockwise turns or one of said clockwise turns that is adjacent to the one of said first reversing portions or said second reversing portions;

fitting another one of said first reversing portions or said second reversing portions on the support wire, the another one of said first reversing portions or said second reversing portions being adjacent to said one of said counterclockwise turns or said one of said clockwise turns that has the support wire housed thereinside; and rotating said spiral support along the spiral direction so as to house the support wire inside another one of said counterclockwise turns or another one of said clockwise turns that is adjacent to the another one of said first reversing portions or said second reversing portions, wherein said first reversing portion is a left to right "L/R" reversing portion which is provided where said plurality of counterclockwise turns continue in one direction along the common axis to a neighboring one of said plurality of clockwise turns, and said second reversing portion is a right to left "R/L" reversing portion which is provided where each of said plurality of clockwise turns continue in the direction to a neighboring one of said plurality of counterclockwise turns along the common axis, and wherein seen from along the common axis said L/R reversing portion and said R/L reversing portion protrude from the circumference formed by said plurality of counterclockwise turns and said plurality of clockwise turns.

12. A method of installing a spiral support on a support wire, the spiral support being composed of a length of material having a plurality of counterclockwise turns leading into a transition portion which forms a first reversing portion being a loop transitioning to a length of said material having a plurality of clockwise turns leading into another transition portion forming a second reversing portion wherein said loops are along a common axis and said second reversing portion terminates in a length, the method comprising:

attaching a cable lead-in wire to one end portion of the spiral support;

fitting one of said first reversing portions or said second reversing portions that is closer to the one end portion to which the cable lead-in wire is attached on the cable lead-in wire and the support wire that has been stretched in advance;

rotating said spiral support along a spiral direction so as to house the support wire and cable lead-in wire inside one of said counterclockwise turns or one of said clockwise turns that is adjacent to the one of said first reversing portions or said second reversing portions;

fitting another one of said first reversing portions or said second reversing portions on the support wire, the another one of said first reversing portions or said second reversing portions being adjacent to said one of said counterclockwise turns or said one of said clockwise turns that has the support wire and the cable lead-in wire housed thereinside; and rotating said spiral support along the spiral direction so as to house the support wire inside another one of said counterclockwise turns or another one of said clockwise turns that is adjacent to the another one of said first reversing portions or said second reversing portions, wherein said first reversing portion is a left to right "L/R" reversing portion which is provided where said plurality of counterclockwise turns continue in one direction along the common axis to a neighboring one of said plurality of clockwise turns, and said second reversing portion is a right to left "R/L" reversing portion which is provided where each of said plurality of clockwise turns continue in the direction to a neighboring one of said plurality of counterclockwise turns along the common axis, and wherein seen from along the common axis said L/R reversing portion and said R/L reversing portion protrude from the circumference formed by said plurality of counterclockwise turns and said plurality of clockwise turns.

13. A method of installing a spiral support on a support wire, the spiral support being composed of a length of material having a plurality of counterclockwise turns leading into a transition portion which forms a first reversing portion being a loop transitioning to a length of said material having a plurality of clockwise turns leading into another transition portion forming a second reversing portion wherein said loops are along a common axis and said second reversing portion terminates in a length, the method comprising:

fitting said first reversing portions or said second reversing portions on the support wire that has been stretched in advance while the common axis is held along the support wire, said first reversing portions or said second reversing portions being directed to one direction and are substantially aligned along one line; and rotating said spiral support along the spiral direction so as to house the support wire inside said spiral support over the entire length thereof, wherein said first reversing portion is a left to right "L/R" reversing portion which is provided where said plurality of counterclockwise turns continue in one direction along the common axis to a neighboring one of said plurality of clockwise turns, and said second reversing portion is a right to left "R/L" reversing portion which is provided where each of said plurality of clockwise turns continue in the direction to a neighboring one of said plurality of counterclockwise turns along the common axis, and wherein seen from along the common axis said L/R reversing portion and said R/L reversing portion protrude from the circumference formed by said plurality of counterclockwise turns and said plurality of clockwise turns.

14. A method of installing a spiral support on a support wire, the spiral support being composed of a length of material having a plurality of counterclockwise turns leading into a transition portion which forms a first reversing portion being a loop transitioning to a length of said material having a plurality of clockwise turns leading into another transition portion forming a second reversing portion wherein said loops are along a common axis and said second reversing portion terminates in a length, the method comprising:

inserting a cable lead-in wire inside said spiral support from a first end to a second end thereof, said spiral support having been supported by the support wire;

attaching one end of said cable lead-in wire to the second end of said spiral support;

attaching the first end of said spiral support to one of posts that support the support wire stretched therebetween; and pulling the second end of said spiral support to which the one end of said cable lead-in wire is attached along the support wire until the second end of said spiral support reaches another one of the posts, thereby installing said spiral support along with said cable lead-in wire over the entire length of said spiral support, wherein said first reversing portion is a left to right "L/R" reversing portion which is provided where said plurality of counterclockwise turns continue in one direction along the common axis to a neighboring one of said plurality of clockwise turns, and said second reversing portion is a right to left "R/L" reversing portion which is provided where each of said plurality of clockwise turns continue in the direction to a neighboring one of said plurality of counterclockwise turns along the common axis, and wherein seen from along the common axis said L/R reversing portion and said R/L reversing portion protrude from the circumference formed by said plurality of counterclockwise turns and said plurality of clockwise turns.

15. A method of laying a cable, comprising:

installing a spiral support on a support wire along with a cable lead-in wire, the spiral support being composed of a length of material having a plurality of counterclockwise turns leading into a transition portion which forms a first reversing portion being a loop transitioning to a length of said material having a plurality of clockwise turns leading into another transition portion forming a second reversing portion wherein said loops are along a common axis and said second reversing portion terminates in a length; and pulling a cable so as to lay the cable in said spiral support by use of said cable lead-in wire, wherein said first reversing portion is a left to right "L/R" reversing portion which is provided where said plurality of counterclockwise turns continue in one direction along the common axis to a neighboring one of said plurality of clockwise turns, and said second reversing portion is a right to left "R/L" reversing portion which is provided where each of said plurality of clockwise turns continue in the direction to a neighboring one of said plurality of counterclockwise turns along the common axis, and wherein seen from along the common axis said L/R reversing portion and said R/L reversing portion protrude from the circumference formed by said plurality of counterclockwise turns and said plurality of clockwise turns.

16. A spiral support comprising:

a length of material having a counterclockwise turn leading into a transition portion which forms a first reversing portion being a loop transitioning to a length of said material having a clockwise turn leading into another transition portion forming a second reversing portion wherein said loops are along a common axis and said second reversing portion terminates in a counterclockwise turn, wherein said first reversing portion is a left to right "L/R" reversing portion which is provided where said counterclockwise turn continues in one direction along the common axis to a neighboring one of said clockwise turns, and said second reversing portion is a right to left "R/L" reversing portion which is provided where each of said clockwise turns continues in the direction to a neighboring one of said counterclockwise turns along the common axis, and wherein seen from along the common axis said L/R reversing portion and said R/L reversing portion protrude from the circumference formed by said counterclockwise turn and said clockwise turn.

17. A spiral support comprising:

a length of material having a plurality of counterclockwise turns leading into a transition portion which forms a first reversing portion being a loop transitioning to a length of said material having a plurality of clockwise turns leading into another transition portion forming a second reversing portion wherein said loops are along a common axis and said second reversing portion terminates in a length, wherein said first reversing portion is a left to right "L/R" reversing portion which is provided where said plurality of counterclockwise turns continue in one direction along the common axis to a neighboring one of said plurality of clockwise turns, and said second reversing portion is a right to left "R/L" reversing portion which is provided where each of said plurality of clockwise turns continue in the direction to a neighboring one of said plurality of counterclockwise turns along the common axis, and wherein seen from along the common axis said L/R reversing portion and said R/L reversing portion protrude from the circumference formed by said plurality of counterclockwise turns and said plurality of clockwise turns.

18. A spiral support comprising:

a length of material having a turn in a first rotational direction leading into a transition portion which forms a first reversing portion being a loop transitioning to a length of said material having turn in a second rotational direction leading into another transition portion forming a second reversing portion wherein said loops are along a common axis and said second reversing portion terminates in a length, wherein said first reversing portion is a left to right "L/R" reversing portion which is provided where said turn in the first rotational direction continues in one direction along the common axis to a neighboring one of said turns in the second rotational direction, and said second reversing portion is a right to left "R/L" reversing portion which is provided where each of said turns in the second rotational direction continues in the direction to a neighboring one of said turns in the first rotational direction along the common axis, and wherein seen from along the common axis said L/R reversing portion and said R/L reversing portion protrude from the circumference formed by said turn in the first rotational direction and said turn in the second rotational direction.

* * * * *